(12) United States Patent
Kottomtharayil et al.

(10) Patent No.: US 8,229,954 B2
(45) Date of Patent: *Jul. 24, 2012

(54) MANAGING COPIES OF DATA (75) Inventors: Rajiv Kottomtharayil, Marlboro, NJ (US); Parag Gokhale, Ocean, NJ (US); Jun Lu, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,034

(22) Filed: Jan. 4, 2012

(65) Prior Publication Data

US 2012/0131052 A1    May 24, 2012

Related U.S. Application Data

(60) Continuation of application No. 13/074,157, filed on Mar. 29, 2011, now Pat. No. 8,099,428, which is a continuation of application No. 13/019,132, filed on Feb. 1, 2011, now Pat. No. 7,984,063, which is a continuation of application No. 12/794,437, filed on Jun. 4, 2010, now Pat. No. 7,882,093, which is a division of application No. 11/694,890, filed on Mar. 30, 2007, now Pat. No. 7,734,669.

(60) Provisional application No. 60/871,735, filed on Dec. 22, 2006.

(51) Int. Cl.
*G06F 17/30* (2006.01)
(52) U.S. Cl. ........................................ 707/769
(58) Field of Classification Search .............. 707/609, 707/705, 758, 769, 790
See application file for complete search history.

(56) References Cited

U.S. PATENT DOCUMENTS

| 4,464,122 A | 8/1984 | Fuller et al. |
| 4,686,620 A | 8/1987 | Ng |
| 4,995,035 A | 2/1991 | Cole et al. |
| 5,005,122 A | 4/1991 | Griffin et al. |

(Continued)

FOREIGN PATENT DOCUMENTS

EP    0259912 A1    3/1988

(Continued)

OTHER PUBLICATIONS

Pitoura et al, Locating Objects in Mobile Computing, IEEE 2001, pp. 571-592.*

(Continued)

*Primary Examiner* — Fred I Ehichioya
(74) *Attorney, Agent, or Firm* — Perkins Coie LLP (57) ABSTRACT

A method in a computer system for retrieving data from one of multiple copies of the data is provided, referred to as the data management system. The data management system receives a request identifying a data object to be accessed. Then, the data management system queries a metabase to locate data copies that contain the identified data object, wherein the data copies are created from similar source data, and wherein for each data copy the metabase contains an indication of the availability of the copy relative to other copies. Next, the data management system determines one of the located data copies to use to access the identified data object, wherein the determination is made based on the indicated availability contained in the metabase for each of the located data copies. Then, the data management system accesses the identified data object using the determined one of the located data copies.

18 Claims, 8 Drawing Sheets

U.S. PATENT DOCUMENTS

| | | |
|---|---|---|
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 | 7/2001 | Dunham |
| 6,275,953 B1 | 8/2001 | Vahalia et al. |
| 6,298,439 B1 | 10/2001 | Beglin |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Emens et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 * | 1/2005 | Tsai ............................ 709/217 |
| 6,839,803 B1 | 1/2005 | Loh et al. |
| 6,850,994 B2 | 2/2005 | Gabryjelski |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,058,661 B2 | 6/2006 | Ciaramitaro et al. |
| 7,099,901 B2 | 8/2006 | Sutoh et al. |
| 7,107,298 B2 | 9/2006 | Prahlad et al. |
| 7,133,870 B1 * | 11/2006 | Tripp et al. ................ 707/723 |
| 7,139,826 B2 | 11/2006 | Watanabe et al. |
| 7,146,387 B1 | 12/2006 | Russo et al. |
| 7,155,421 B1 | 12/2006 | Haldar |
| 7,155,481 B2 | 12/2006 | Prahlad et al. |

| | | | |
|---|---|---|---|
| 7,159,081 B2 | 1/2007 | Suzuki | |
| 7,171,468 B2 | 1/2007 | Yeung et al. | |
| 7,171,585 B2 | 1/2007 | Gail et al. | |
| 7,188,141 B2 | 3/2007 | Novaes | |
| 7,240,100 B1 | 7/2007 | Wein et al. | |
| 7,246,207 B2 | 7/2007 | Kottomtharayil et al. | |
| 7,269,664 B2 | 9/2007 | Hutsch et al. | |
| 7,284,033 B2 | 10/2007 | Jhanji | |
| 7,287,047 B2 | 10/2007 | Kavuri | |
| 7,290,017 B1 | 10/2007 | Wang et al. | |
| 7,313,659 B2 | 12/2007 | Suzuki | |
| 7,346,623 B2 | 3/2008 | Prahlad et al. | |
| 7,346,676 B1 | 3/2008 | Swildens et al. | |
| 7,346,751 B2 | 3/2008 | Prahlad et al. | |
| 7,376,947 B2 | 5/2008 | Evers | |
| 7,379,978 B2 | 5/2008 | Anderson et al. | |
| 7,386,535 B1 | 6/2008 | Kalucha et al. | |
| 7,395,282 B1 | 7/2008 | Crescenti et al. | |
| 7,424,543 B2 | 9/2008 | Rice, III | |
| 7,434,219 B2 | 10/2008 | De Meno et al. | |
| 7,457,790 B2 | 11/2008 | Kochunni et al. | |
| 7,472,142 B2 | 12/2008 | Prahlad et al. | |
| 7,496,841 B2 | 2/2009 | Hadfield et al. | |
| 7,565,484 B2 | 7/2009 | Ghosal et al. | |
| 7,577,694 B2 | 8/2009 | Nakano et al. | |
| 7,584,469 B2 | 9/2009 | Mitekura et al. | |
| 7,587,715 B1 | 9/2009 | Barrett et al. | |
| 7,593,935 B2 | 9/2009 | Sullivan | |
| 7,596,713 B2 | 9/2009 | Mani-Meitav et al. | |
| 7,603,626 B2 | 10/2009 | Williams et al. | |
| 7,606,844 B2 | 10/2009 | Kottomtharayil | |
| 7,668,884 B2 | 2/2010 | Prahlad et al. | |
| 7,676,542 B2 | 3/2010 | Moser et al. | |
| 7,689,899 B2 | 3/2010 | Leymaster et al. | |
| 7,730,031 B2 | 6/2010 | Forster | |
| 7,734,593 B2 | 6/2010 | Prahlad et al. | |
| 7,734,669 B2 | 6/2010 | Kottomtharayil et al. | |
| 7,751,628 B1 | 7/2010 | Reisman | |
| 7,792,789 B2 | 9/2010 | Prahlad et al. | |
| 7,814,118 B2 | 10/2010 | Kottomtharayil et al. | |
| 7,831,793 B2 | 11/2010 | Chakravarty et al. | |
| 7,840,537 B2 | 11/2010 | Gokhale et al. | |
| 7,844,676 B2 | 11/2010 | Prahlad et al. | |
| 7,865,517 B2 | 1/2011 | Prahlad et al. | |
| 7,882,077 B2 | 2/2011 | Gokhale et al. | |
| 7,882,093 B2 | 2/2011 | Kottomtharayil et al. | |
| 7,937,420 B2 | 5/2011 | Tabellion et al. | |
| 7,937,702 B2 | 5/2011 | De Meno et al. | |
| 7,984,063 B2 | 7/2011 | Kottomtharayil et al. | |
| 8,037,028 B2 | 10/2011 | Prahlad et al. | |
| 8,055,627 B2 | 11/2011 | Prahlad et al. | |
| 8,060,514 B2 * | 11/2011 | Arrouye et al. | 707/741 |
| 2002/0032878 A1 | 3/2002 | Karpf | |
| 2002/0049883 A1 | 4/2002 | Schneider et al. | |
| 2003/0018622 A1 * | 1/2003 | Chau | 707/3 |
| 2003/0050979 A1 | 3/2003 | Takahashi | |
| 2003/0101086 A1 | 5/2003 | San Miguel | |
| 2004/0267815 A1 * | 12/2004 | De Mes | 707/104.1 |
| 2005/0039069 A1 | 2/2005 | Prahlad et al. | |
| 2005/0097070 A1 | 5/2005 | Enis et al. | |
| 2005/0251786 A1 | 11/2005 | Citron et al. | |
| 2005/0278207 A1 | 12/2005 | Ronnewinkel | |
| 2006/0036619 A1 | 2/2006 | Fuerst et al. | |
| 2006/0070061 A1 | 3/2006 | Cox et al. | |
| 2006/0115802 A1 | 6/2006 | Reynolds | |
| 2006/0116999 A1 | 6/2006 | Dettinger et al. | |
| 2006/0149604 A1 | 7/2006 | Miller | |
| 2006/0149724 A1 | 7/2006 | Ritter et al. | |
| 2006/0224846 A1 | 10/2006 | Amarendran et al. | |
| 2007/0022145 A1 | 1/2007 | Kavuri | |
| 2007/0028229 A1 | 2/2007 | Knatcher | |
| 2007/0043715 A1 | 2/2007 | Kaushik et al. | |
| 2007/0061298 A1 * | 3/2007 | Wilson et al. | 707/3 |
| 2007/0166674 A1 | 7/2007 | Kochunni et al. | |
| 2007/0250810 A1 | 10/2007 | Tittizer et al. | |
| 2008/0229037 A1 | 9/2008 | Bunte et al. | |
| 2008/0243855 A1 | 10/2008 | Prahlad et al. | |
| 2008/0320319 A1 | 12/2008 | Muller et al. | |
| 2009/0171883 A1 | 7/2009 | Kochunni et al. | |
| 2009/0177719 A1 | 7/2009 | Kavuri | |
| 2009/0319534 A1 | 12/2009 | Gokhale | |
| 2009/0319585 A1 | 12/2009 | Gokhale | |
| 2009/0320029 A1 | 12/2009 | Kottomtharayil | |
| 2009/0320033 A1 | 12/2009 | Gokhale et al. | |
| 2009/0320037 A1 | 12/2009 | Gokhale et al. | |
| 2010/0031017 A1 | 2/2010 | Gokhale et al. | |
| 2010/0070466 A1 | 3/2010 | Prahlad et al. | |
| 2010/0070474 A1 | 3/2010 | Lad | |
| 2010/0070725 A1 | 3/2010 | Prahlad et al. | |
| 2010/0076932 A1 | 3/2010 | Lad | |
| 2010/0114837 A1 | 5/2010 | Prahlad et al. | |
| 2011/0093471 A1 | 4/2011 | Brockway et al. | |
| 2011/0173171 A1 | 7/2011 | De Meno et al. | |
| 2011/0173207 A1 | 7/2011 | Kottomtharayil et al. | |

FOREIGN PATENT DOCUMENTS

| | | |
|---|---|---|
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 | 4/1999 |
| EP | 0981090 A1 | 2/2000 |
| EP | 0986011 | 3/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 | 3/1999 |
| WO | WO-00/58865 | 10/2000 |
| WO | WO-01/06368 | 1/2001 |
| WO | WO-01/16693 | 3/2001 |
| WO | WO-0180005 | 10/2001 |

OTHER PUBLICATIONS

Rowe et al, Indexes for User Access to Large Video Databases, Storage and Retrieval for Image and Video Databases II, IS&T/SPIE Symp, Feb. 1994, pp. 1-12.*

U.S. Appl. No. 12/058,575, filed Mar. 28, 2008, Method and System for Searching Stored Data.

U.S. Appl. No. 12/058,589, filed Mar. 28, 2008, Method and System for Searching Stored Data.

U.S. Appl. No. 12/511,653, filed Jul. 29, 2009, Method and System for Searching Stored Data.

U.S. Appl. No. 13/076,634, filed Mar. 31, 2011, Method and System for Searching Stored Data.

U.S. Appl. No. 11/694,890, filed Mar. 30, 2007, Managing Copies of Data.

U.S. Appl. No. 12/060,055, filed Mar. 31, 2008, Managing Copies of Data.

U.S. Appl. No. 12/060,045, filed Mar. 31, 2008, Managing Copies of Data.

U.S. Appl. No. 12/794,437, filed Jun. 4, 2010, Managing Copies of Data.

U.S. Appl. No. 13/019,132, filed Feb. 1, 2011, Managing Copies of Data.

U.S. Appl. No. 13/074,157, filed Mar. 29, 2011, Managing Copies of Data.

U.S. Appl. No. 09/609,977.

U.S. Appl. No. 13/076,792, filed Mar. 21, 2011, Kumarasamy.

U.S. Appl. No. 13/250,349, filed Sep. 30, 2011, Prahlad.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.

Hennessy et al., "Computer Architecture—A Quantitative Approach", 2nd Edition, 1996, pp. 246-250.

\* cited by examiner

| Location | Keywords | User Tags | Application | Available |
|---|---|---|---|---|
| http://portal/budget.xls | Finance, Profit, Loss | Accounting, Confidential | Spreadsheet | Immediate |
| Backup Tape C, Offset 160 | Vacation, France | Personal | Email | 1 hour |
| Offsite Tape X | Project Plan, Schedule | Project X, Cancelled | Presentation | 1 week |
| ... | | | | |

MANAGING COPIES OF DATA

CROSS-REFERENCE TO RELATED APPLICATIONS

The present application is a continuation of U.S. patent application Ser. No. 13/074,157 entitled "MANAGING COPIES OF DATA," filed Mar. 29, 2011 now U.S. Pat. No. 8,099,428, which is a continuation of U.S. patent application Ser. No. 13/019,132 entitled "MANAGING COPIES OF DATA," filed on Feb. 1, 2011 (now U.S. Pat. No. 7,984,063), which is a continuation of U.S. patent application Ser. No. 12/794,437 entitled "MANAGING COPIES OF DATA," filed on Jun. 4, 2010 (now U.S. Pat. No. 7,882,093) which is a divisional of U.S. patent application Ser. No. 11/694,890 entitled "MANAGING COPIES OF DATA," filed on Mar. 30, 2007 (now U.S. Pat. No. 7,734,669) which claims priority to U.S. Provisional Application No. 60/871,735 entitled "METHOD AND SYSTEM FOR SEARCHING STORED DATA," and filed on Dec. 22, 2006, each of which is hereby incorporated by reference.

BACKGROUND

Computer systems contain large amounts of data. This data includes personal data, such as financial data, customer/client/patient contact data, audio/visual data, and much more. This data also includes information related to the correct operation of the computer system, such as operating system files, application files, user settings, and so on. With the increased reliance on computer systems to store critical information, the importance of protecting data has grown. Traditional data protection systems, such as backup systems, receive an identification of a file location to protect, then create one or more secondary copies containing the contents of the protected up location. These secondary copies can then later be used to restore the original data should anything happen to the original data.

In corporate environments, protecting data is generally part of a routine process that is performed for many computer systems within an organization. For example, a company might back up critical computing systems related to e-commerce such as databases, file servers, web servers, and so on. The company may also back up computing systems used by each of its employees, such as those used by an accounting department, marketing department, engineering, and so forth.

Because of the amount of data in an organization, secondary copies of data for an organization's computing systems are often very large and can require the purchase of expensive storage devices and storage media. The restoration of data in the event of data loss is also slowed by the large size of the secondary copy. As the amount of protected data increases, locating and restoring data requires more actions to be taken. For example, it may be necessary to search many backup tapes to find the correct data. The quantity of secondary copy media, such as tapes, may mean that some secondary copy media has been moved offsite such that it must first be retrieved before data can be recovered from it. Each of these factors increases the cost of protecting data and the time required to recover data in the event of data loss. Quick recovery of data is often critical to today's businesses, and any additional delay could affect business operations and customers' satisfaction with the business.

Management of data in this way also consumes resources, and it is often desirable to minimize impact to computing systems to provide maximum availability for handling customer or employee requests. Some organizations defer activities such as performing backups until off hours, such as early in the morning to reduce the impact to the availability of systems. However, recovery of a file may be needed during business hours or at other inconvenient times, and choosing the best way to retrieve the data is important for maintaining the availably of the system.

There is a need for a system that overcomes the above problems, as well as one that provides additional benefits.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

The headings provided herein are for convenience only and do not necessarily affect the scope or meaning of the claimed invention.

Overview

A data management system often contains a primary or production copy of data, and one or more secondary copies created from the primary copy of the data. For example, a web server may contain the primary copy of the data. A snapshot, change journal, replication, migration, backup, or other storage operation may be performed to create the one or more secondary copies of the data. For example, a snapshot operation may create an image of the current state of the primary copy, and the data management system may transfer the snapshot to another system for storage as a secondary copy. The secondary copy may later be encrypted or otherwise processed to create additional secondary copies. For example, an organization may initially backup data to a first secondary copy and later encrypt the data to a second secondary copy before the data is stored in a third-party offsite storage facility.

A method and system for managing copies of data is provided, referred to as the data management system. The data management system creates and manages copies of data. For example, the data management system may create a secondary copy such as a backup of the data stored on each of the computer systems within an organization. The secondary copy represents a second version of the original source version of the data. The data management system may make additional secondary copies of the data, called auxiliary copies. For example, the data management system may create secondary copies to perform additional operations on the data (e.g., encryption and protection) and to store the data in a new location (e.g., in a tape library or at an off-site data vault). The data management system may also store information about the data managed by the system within a data structure such as a database, also called a metabase. The metabase may contain information such as when the data management system performed the last data copy, where each of the data copies is stored, what files are contained within each data copy, and so on. When the data management system receives a request to access data, there may be many copies of the data available, and the data management system selects a desirable copy of the data to satisfy the access request as described in further detail below. The data management system may first consult the metabase to determine which copies contain the requested data without accessing the computer systems where the data is actually stored. In this way, the data management system provides high availability of data while reducing the impact of access requests on critical computer systems.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Unless described otherwise below, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or figures) based on the detailed description provided herein.

Figure 1:
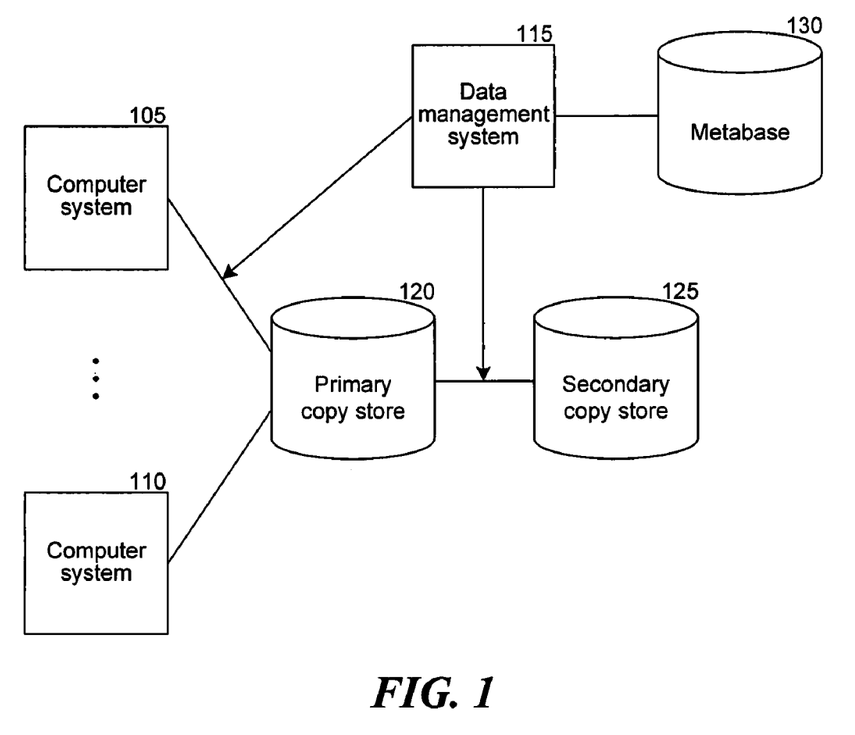
FIG. 1 is a block diagram that illustrates components of a data management system, in one embodiment.

FIG. 1 is a block diagram that illustrates components of the data management system, in one embodiment. The data management system 115 interacts with computer systems (e.g., 105 and 110) within an organization. The data management system 115 creates a first secondary copy of the data stored on the computer system 105 and a first secondary copy of the data stored on the computer system 110 and stores the first secondary copies in a primary copy store 120. The data management system 115 also creates additional secondary copies of the data within a secondary copy data store 125. The data management system stores information about the data and the copies within a metabase 130. Although the figure depicts a single metabase 130, the data management system may distribute the metabase across several computer systems according to many distribution schemes that will be recognized by those of ordinary skill in the art. For example, a metabase could be associated with each computer system, or with a group of computer systems, and so on.

FIG. 1 and the discussion herein provide a brief, general description of a suitable computing environment in which the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Creating Copies

The data management system may create the primary copy of the data stored on a computer system in a variety of ways. In some embodiments, snapshot software installed on each computer system is used to capture a point-in-time view of the data on a computer system. The data management system may copy the snapshot data to another computer system. Snapshots may contain a snapshot of all of the data on a system, or they may be incremental and provide information about the data that has changed since a previous snapshot was taken. In some embodiments, change journaling software (often built into the operating system) is used to detect changes to data and to update the primary copy. In some embodiments, an agent is installed for each type of data stored on a computer system. The agent may be designed to copy a specific type of data (e.g., database data or data produced by a specific application) more efficiently than a simple copy of the underlying data files. Once a primary copy has been created, additional operations can be performed on the data without accessing the original computer system from which the data was copied.

The data management system may copy data from a computer system as files or the data management system may process the contents of the files as application data. As described above, an agent may be installed that interprets data produced by a particular application. For example, data stored by an email server (e.g., Microsoft Exchange Server), may be stored in a series of files. Creating a copy of the files is often not as useful as interpreting the data itself and storing the data in its interpreted form. For example, the data from an email server may be stored in one large file with a non-descriptive name, such as "mailbox.dat," but it is more useful when searching for data to understand that the file contains mailboxes belonging to specific users, and that each of those mailboxes contains email messages having descriptive information such as a subject, TO header, and so on. Therefore, rather than simply storing the file, the data management system may parse, recognize, and store information about each user's mailbox and the email messages contained within it. Similar processes may be used to store data created by database applications, word processors, accounting software, and so on.

FIGS. 2-6 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

Figure 2:
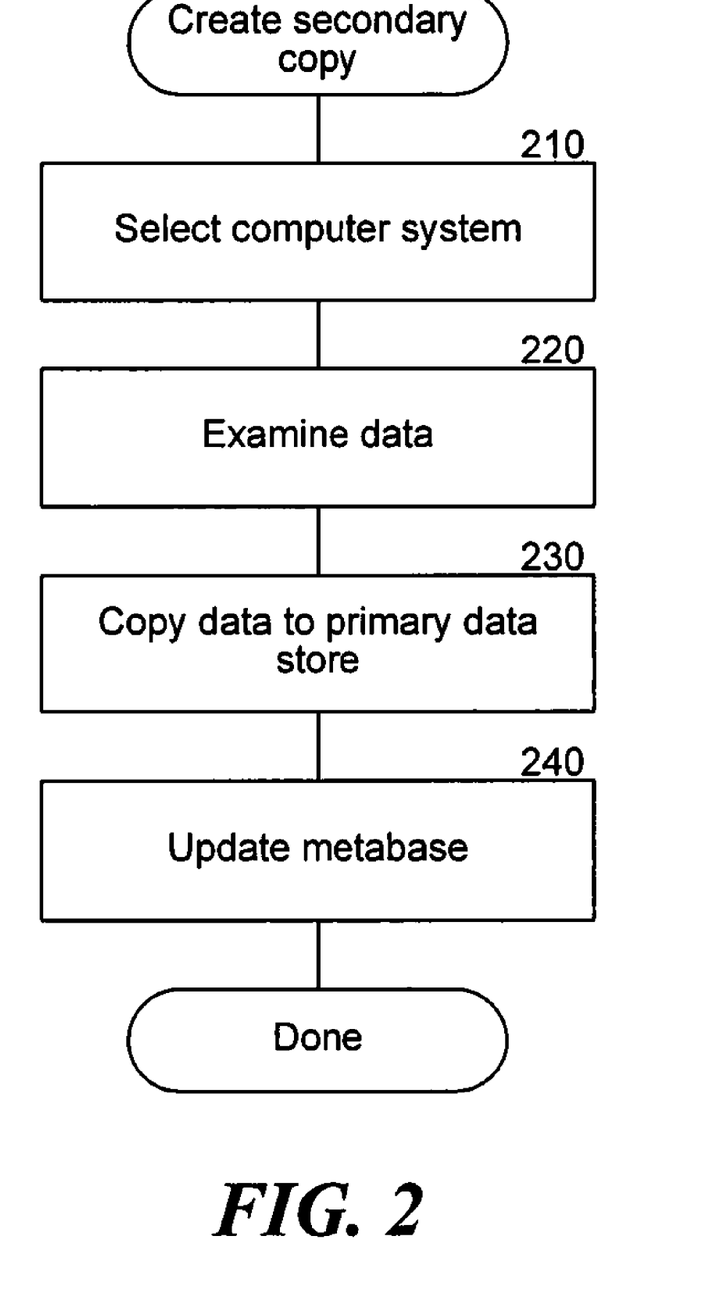
FIG. 2 is a flow diagram that illustrates the steps performed by the data management system to create a primary copy of data.

FIG. 2 is a flow diagram that illustrates the steps performed by the data management system to create a first secondary copy of data. In step 210, the data management system selects a computer system that will provide the primary data to be copied. In step 220, the data management system examines the data to determine how the data should be copied. For example, as described above, the data may be stored on a file-by-file basis, or additional information may be captured for application data generated by recognized applications. In step 230, the data management system copies the data from the selected computer system to the primary copy data store. In step 240, the data management system updates the metabase with information about the first secondary copy. The information added to the metabase may contain information about the content within the data, access control information obtained from the source location of the data, and so on. The data management system may also perform other operations on the copied data such as classifying the data (e.g., based on keywords within the data, the data content, attributes of the data, and so forth), encrypting the data, and so on. After step 240, these steps conclude.

In some embodiments, the data management system performs additional operations on secondary copies of data. For example, an organization may create an unencrypted first secondary copy, but perform encryption on an auxiliary secondary copy to allow the organization to safely store the auxiliary secondary copy with a third-party data storage provider without worrying that the third party may view confidential information contained within the data. The data management system may also examine the first secondary copy and eliminate duplicate data objects within the first secondary copy to create a single instance of each data object. This process is generally referred to as single instancing. For example, when copying data from multiple computer systems within an organization, each computer system will often contain similar files for the operating system and configuration data. Storing multiple copies of the same data wastes storage space, and increases the time and cost associated with data management, so single instancing can provide substantial cost savings to an organization.

In some embodiments, the data management system creates an index of the content contained within each copy. The index information may be stored within the metabase. The index may contain information such as each of the locations where the data is located, keywords contained within the data, classifications assigned to the data, and user access information describing which users are permitted to view the contents of the data. The content index may be used to facilitate search and retrieval of the data, such as in response to a user request to restore a particular file.

In some embodiments, the data management system performs the operations described above based on a storage policy. For example, operations such as the creation of a primary copy of data may be performed automatically on a schedule. The storage policy defines the types of operations to be performed, and the conditions that trigger their performance. For example, a storage policy may specify the creation of a secondary copy of data onto tape when the primary copy of the data reaches a certain size or is a certain number of days old. The storage policy may also define which computer systems are involved in a particular data management operation, such as a particular pool of servers to use for performing encryption of data.

Figure 3:
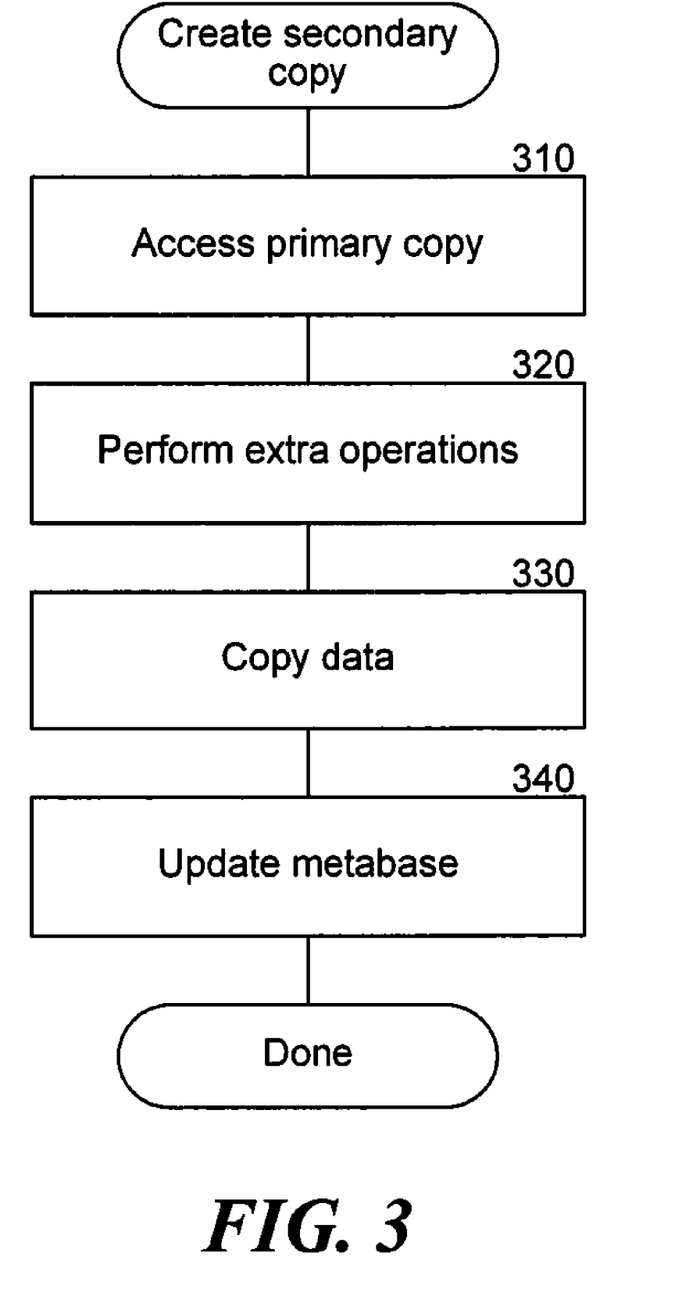
FIG. 3 is a flow diagram that illustrates the steps performed by the data management system to create secondary copies of data.

FIG. 3 is a flow diagram that illustrates the steps performed by the data management system to create secondary copies of data. In step 310, the data management system accesses the primary copy to obtain the data. The system can also create a secondary copy from another secondary copy, or can access the original source location of the data to create the secondary copy. The primary copy is generally preferred over accessing the original source location to reduce the impact of data management operations to the original source location. In step 320, the data management performs extra operations such as those described above, such as encryption, single instancing, and content indexing. In step 330, the data management copies the data from the primary copy or other source location to a secondary copy data store. A variety of media or storage devices can be used as a secondary data store such as a magnetic disk, a tape or tape library, a network-attached storage (NAS) device, a redundant array of inexpensive disks (RAID) array, and so on. In step 340, the data management system updates the metabase with information about the new secondary copy, such as where the copy is stored, what data is stored in it, and any operations performed on the data, such as encryption. This information can be used later when the data is retrieved to determine the difficulty of obtaining specified data from a particular copy. After step 340, these steps conclude.

Retrieving Data

The data management system periodically receives requests to retrieve data from users and from the system itself. For example, a user may search for a specific file or document, and the data management system finds matching data. The system may request a copy of the data on which to perform a data management operation. For example, if a storage policy specifies that an encrypted copy of data should be created, the data management system may query the metabase to locate an available copy of the data to encrypt, so that the original source of the data is not impacted by the encryption operation.

Figure 4:
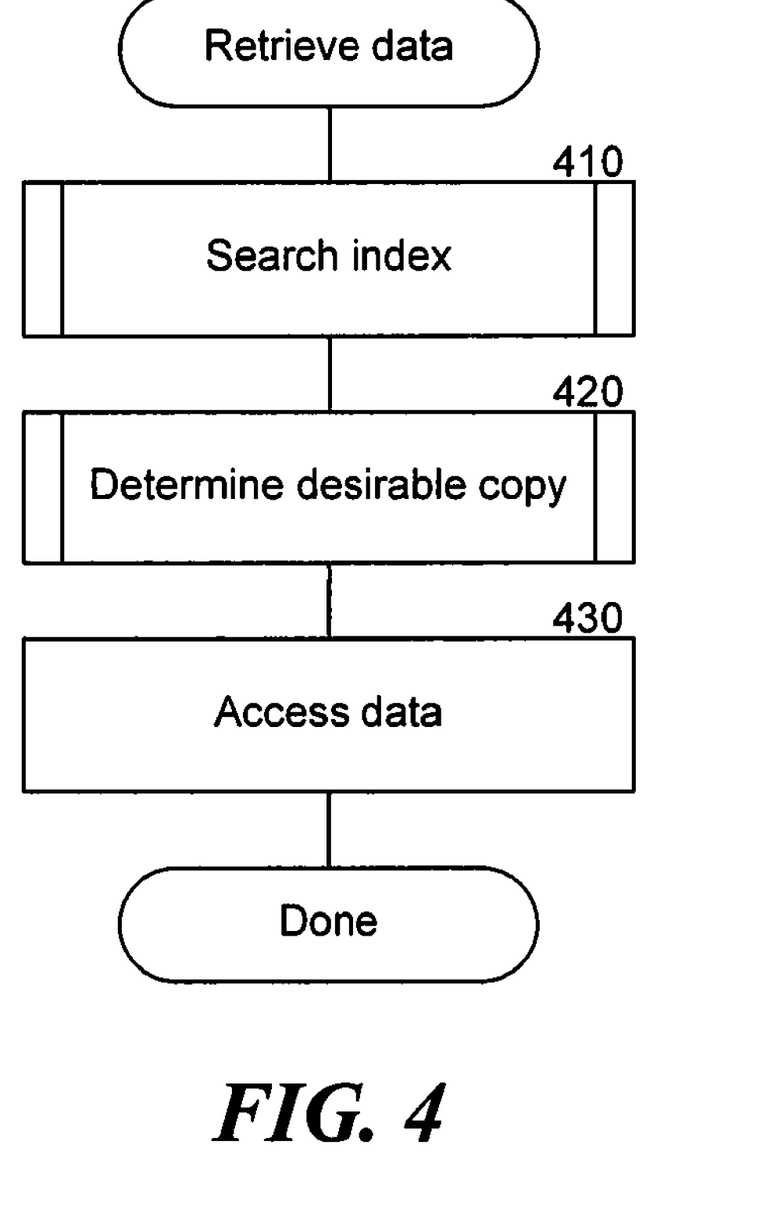
FIG. 4 is a flow diagram that illustrates the steps performed by the data management system to retrieve data in response to a request.

FIG. 4 is a flow diagram that illustrates the steps performed by the data management system to retrieve data in response to a request. In step 410, the data management system searches an index of content available within the system to identify one or more copies containing the data. The content index is maintained by the data management system as data copies are created and stored within the metabase. In step 420, the data management system determines a desirable copy to satisfy the data retrieval request, based on factors such as availability. In some embodiments, the data management system selects a desirable copy from which to access data based on the availability of the data. For example, data stored on a magnetic disk is typically more readily available than data stored in a tape library, and data stored in a tape library is typically more readily available that data stored in an offsite data vault or with a third-party data storage provider. Other qualities of the data copy may also determine its availability. For example, encrypted data must be decrypted before it can be accessed, so an encrypted copy may be slower to access than a non-encrypted copy. A desirable copy may also be chosen based on hardware differences between copies stored in a particular tier or class of a hierarchical storage management (HSM) system. In step 430, the data management system accesses the requested data and provides the data to in response to the request. After step 430, these steps conclude.

In some embodiments, the data management system determines availability based on the environment of the entity requesting the data. For example, if a user of a computer system within an organization is requesting data from another computer system within the organization, then the data management system may factor in the subnet of the two computer systems relative to each other. If a copy is available on the same subnet as the requesting user, then that copy may be preferred over a copy on a different subnet. As another example, the data management system may hierarchically group computer systems within an organization into storage cells that share certain storage characteristics (e.g., network location or storage policies), and a copy may be preferred based on the storage cell that the computer system storing it is associated with. Alternatively or additionally, the purpose of the retrieval request may influence the copy used to retrieve the data. For example, a legal discovery request may specify certain documents that must be retrieved within a long timeframe (e.g., a year), such that the most available copy is not required and a slower copy can be used so that other operations can use the most available copy.

In some embodiments, the data management system determines the age of the data available in each copy. For example, the time a copy was created may be stored with the copy, or the copy may contain other information indicating the time that the data was last modified. For some search requests, an older copy of the data available on tape media may be acceptable, whereas for other search requests only a very recent copy will satisfy the request. If the user is searching for a particular file, the data management system may determine that although a particular copy is older and out of date with respect to some files, the file requested by the user has not changed since the copy was made and the copy can adequately satisfy the user's request. Using this type of analysis, the data management system can select the most appropriate copy to use for many different circumstances.

In some embodiments, the data management system restricts the data accessible to a user based on the user's identity and authentication information stored within the system. Each data object may contain authentication information stored within the metabase that specifies the accessibility of the data object for each user, or the data management system may leverage an existing authentication system, such as Microsoft Windows Active Directory. For example, a person on the engineering team of an organization may be unable to view data objects copied from the CEO's computer system, even though the data objects match the engineer's search criteria. Some copies may also be inaccessible to certain users. For example, some employees within an organization may not be permitted to decrypt encrypted data copies, such that those copies are unavailable for satisfying a data retrieval request from the employee.

Figure 5:
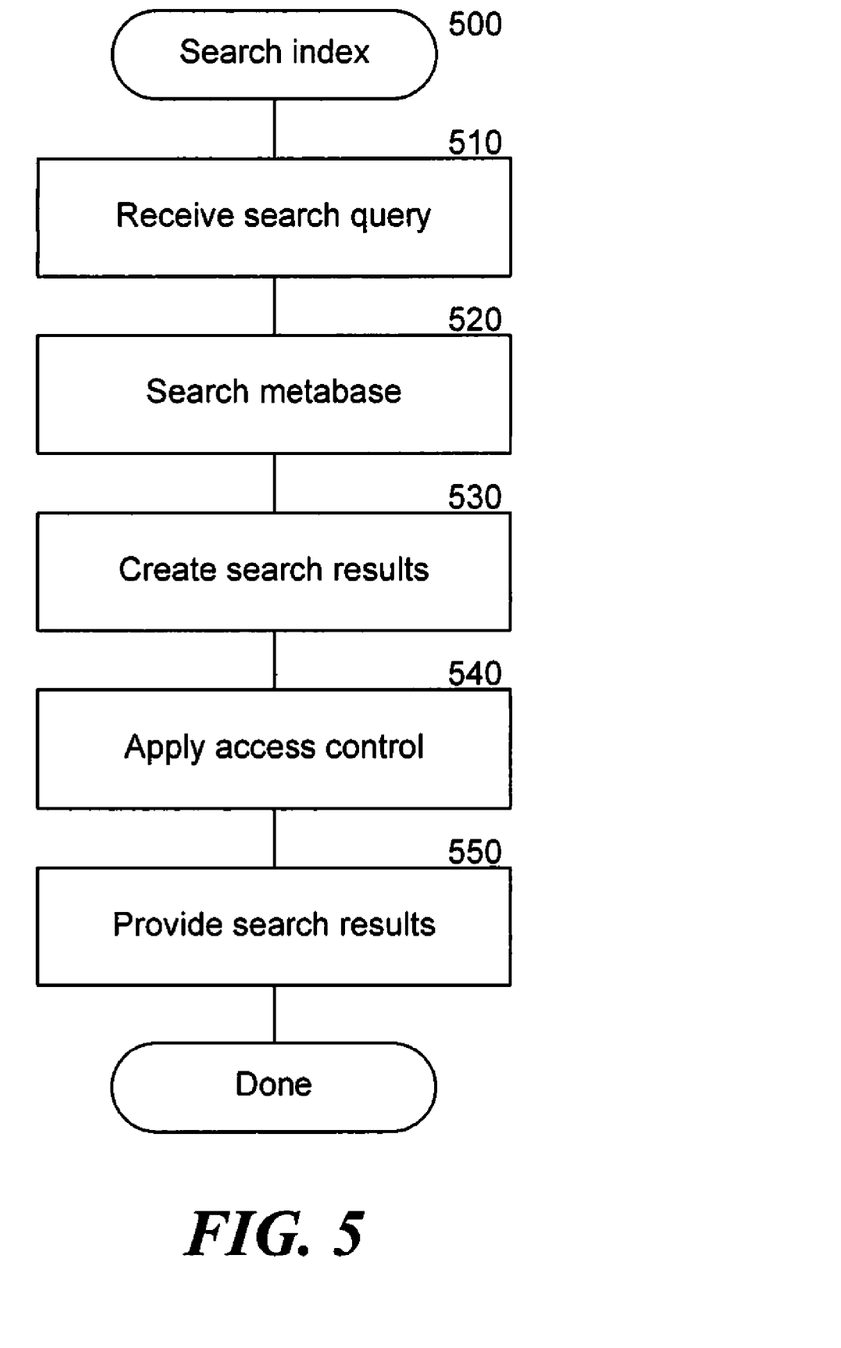
FIG. 5 is a flow diagram that illustrates the steps performed by the data management system to search an index of content.

FIG. 5 is a flow diagram that illustrates the steps performed by the data management system to search the index of content. In step 510, the data management system receives a request to access data in the form of a search query or other means of specifying parameters and characteristics associated with the data to be found. In step 520, the data management system searches the metabase for data having characteristics that satisfy the search query. In step 530, the data management system creates search results from the matching entries within the metabase. In step 540, the data management system removes any entries from the search results that the requesting user does not have the authority to access. In step 550, the data management system returns the search results. Alternatively, rather than removing entries in step 540, step 550 can indicate that the entries are inaccessible such that the entries are still provided in the search results, but the user has an indication that additional authority is needed to access the entries. After step 550, these steps conclude.

Figure 6:
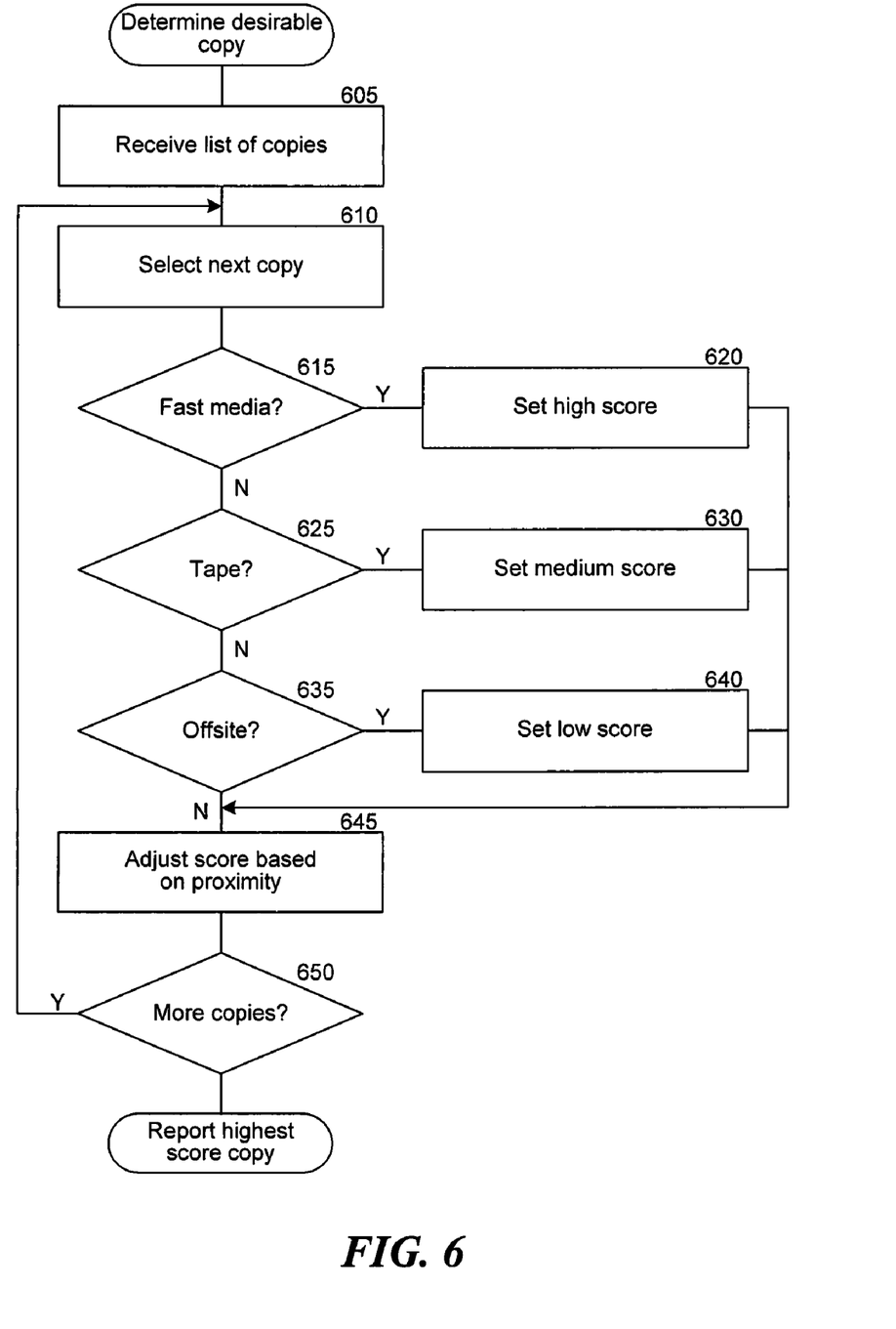
FIG. 6 is a flow diagram that illustrates the steps performed by the data management system to determine the best copy of data from which to satisfy a data retrieval request.

FIG. 6 is a flow diagram that illustrates the steps performed by the data management system to determine a desirable copy of data from which to satisfy a data retrieval request. In step 605, the data management system receives a list of available copies that contain the requested data. For example, one copy may be stored locally on a magnetic disk, while another copy may be stored in a tape library. In step 610, the data management system selects the first copy from the list. In decision step 615, if the copy is stored on fast media, then the data management system continues at step 620 and assigns the selected copy a high availability score, else the component continues at step 625. In decision step 625, if the copy is stored on slower media (e.g., tape), then the data management system continues at step 630 and assigns the selected copy a medium availability score, else the component continues at step 635. In decision step 635, if the copy is stored off-site (e.g., with a third-party data storage provider), then the data management system continues at step 640 and assigns the selected copy a low availability score, else the component continues at step 645. In step 645, the data management system adjusts the score of the selected copy based on the proximity of the copy to the requesting computer system. For example, this step may increase the score of a selected copy accessible on the same network subnet of the requesting computer system. In decision step 650, the data management system loops to step 610 to select the next copy, else the component completes and reports the copy having the highest availability score. The data management system may also maintain a "live" index of copies or resources as data is generated, and the above steps may be performed by checking the index for the values described (e.g., whether the data is on slower media). The data management system then uses this copy to access the data as described in FIG. 4.

Figure 7:
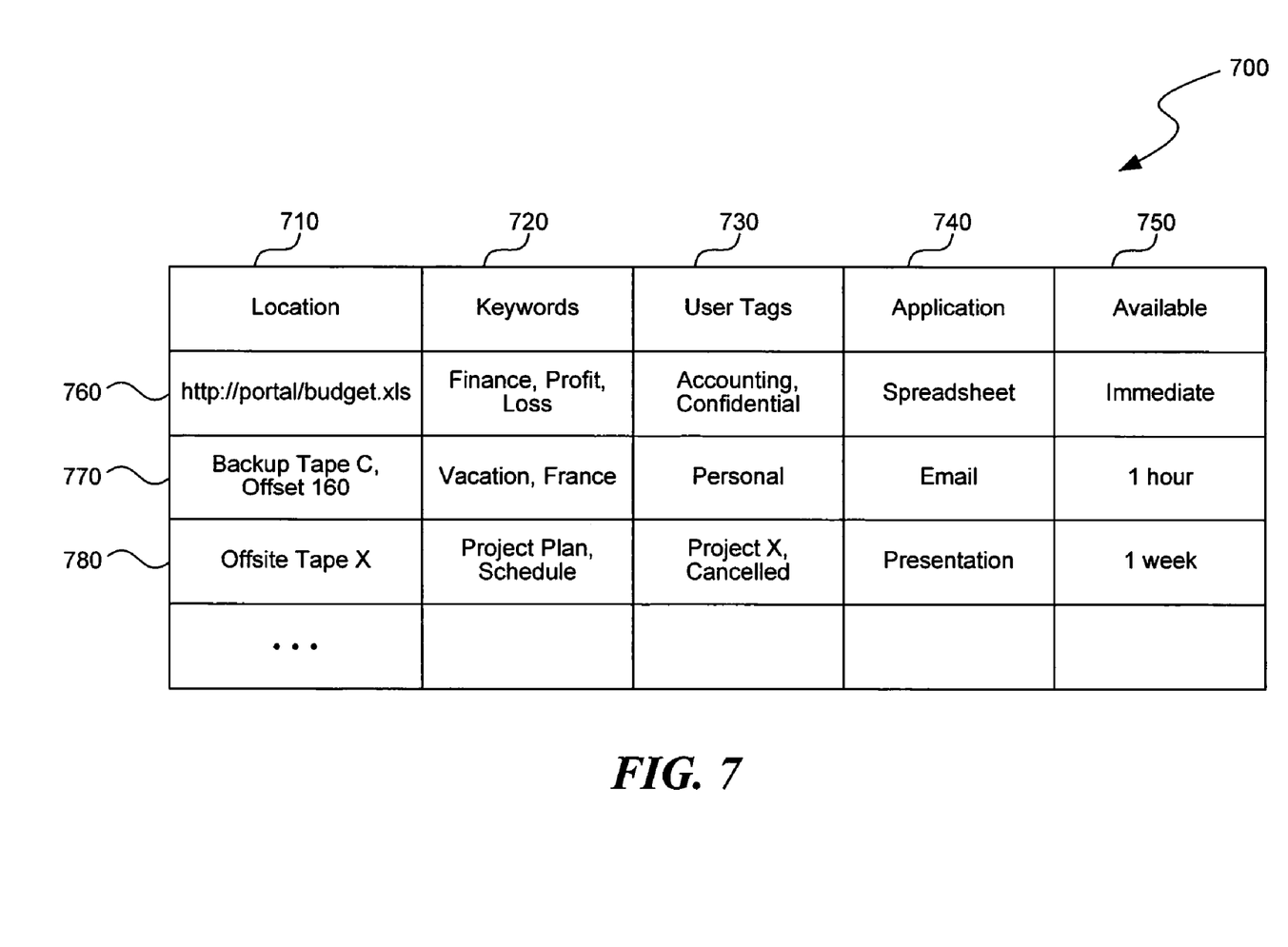
FIG. 7 is a table that illustrates typical contents of a metabase used by the data management system to satisfy a data retrieval request.

FIG. 7 illustrates one of the data structures used by the system. Relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

FIG. 7 is a table that illustrates typical contents of the metabase used by the data management system to satisfy a data retrieval request. The data management system uses this and similar data structures to determine which copy of data to use to satisfy the data retrieval request. For example, the data management system may index data available from multiple copies using a copy stored on media with a higher availability based on the location or other attributes indicated by the data structure described below. As another example, the data management system may prefer an unencrypted copy of the data to an encrypted copy to avoid wasting time unnecessarily decrypting the data. The table 700 contains a location column 710, a keywords column 720, a user tags column 730, an application column 740, and an available column 750. The table 700 contains three sample entries. The first entry 760 specifies a location to a file on the corporate intranet using a web universal resource locator (URL). The entry 760 contains keywords "finance," "profit," and "loss" that identify content within the file. The entry 760 contains tags added by a user that specify that the content comes from the accounting department and is confidential. The entry 760 indicates that a spreadsheet program typically consumes the content, and that the entry is immediately available. Another entry 770 specifies data stored on a local tape that is a personal email, and can be available in about an hour. Another entry 780 specifies an offsite tape that is a presentation related to a cancelled project. The entry 780 refers to offsite data that is available within one week due to the delay of retrieving the archived data from the offsite location.

In some embodiments, the data management system provides a user interface for identifying and retrieving data. For example, the data management system may host a web server that provides access to the metabase, such that a user can submit a search request and find matching data categorized by the metabase. Then, the user can access the web server using a web browser. This allows the user to access data regardless of the operating system of the computer system on which the data was originally stored and regardless of the operating system of the computer system that the user is submitting the request from. In some embodiments, the data management system converts the data within search results returned in response to a user search into a format that is viewable within the web browser. For example, if a search returns a document that is normally opened by a particular word processing program, the data management system may provide the ability to convert and view the document as Hypertext Markup Language (HTML) within the requesting user's web browser. In this way, a user can search for documents created by many types of applications and on many platforms without installing additional software.

Figure 8:
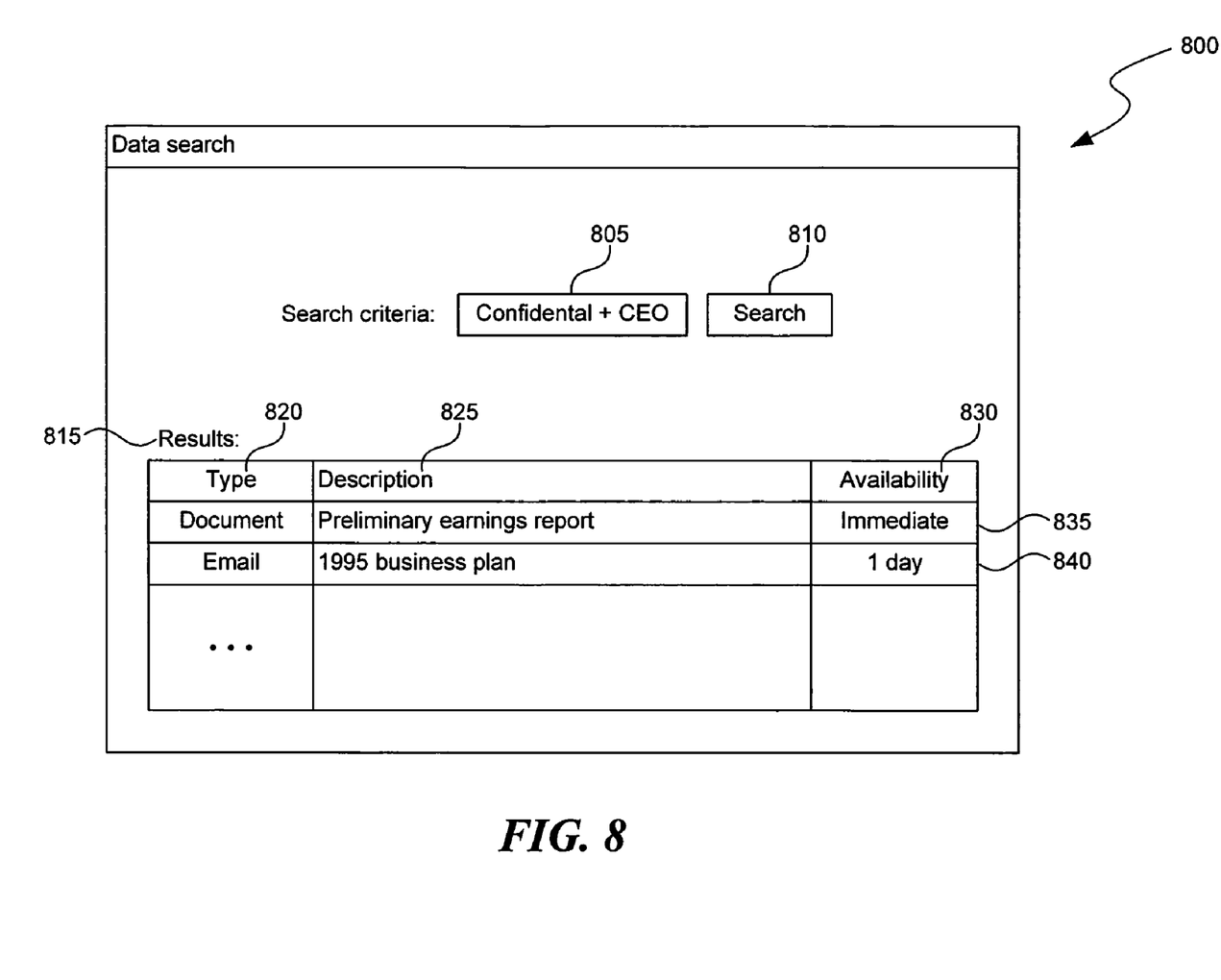
FIG. 8 is a display page of an example display produced by the data management system for retrieving data.

FIG. 8 is a display page of an example display produced by the data management system for retrieving data. The display page could be implemented as a web page, stand-alone application, or any other technology suitable for displaying a user interface. The display page 800 contains a search criteria text entry area 805, and a search button 810. A user can type search criteria within the search criteria text entry area 805 that identifies the type of information the user is trying to retrieve. For example, the user may enter "confidential and CEO" to indicate that the user wants to find documents accessed by the CEO of an organization that are categorized as confidential. The user then presses the search button 810 to begin the search. The display page also contains a list of search results 815 produced by the user's search request. The list of search results 815 contains a type column 820, a description column 825, and an availability column 830. The type column 820 specifies the type of the data object represented by the search results, such as document, email, database entry, and so on. The description column 825 contains a description of the data object, such as the file name for a search result that refers to a file or the subject of a search result that refers to an email message. The availability column 830 contains the availability information for the most available copy determined by the steps described above. The list of search results 815 contains a first sample entry 835 that specifies a document described as "Preliminary Earnings Report" that is immediately available. The list of search results 815 also contains a second sample entry 840 that specifies an email message described as "1995 Business Plan" that is accessible in one day. The difference in availability of the search results may indicate, for example, that one is stored on-site while the other is stored off-site.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method in a computer system for accessing data stored in multiple copies, the method comprising:
   displaying a user interface configured to receive a request identifying at least one data object to be accessed;
   receiving through the user interface a request identifying at least one data object to be accessed;
   querying an index to locate one or more data copies from multiple data copies that contain the identified at least one data object,
      wherein the multiple data copies include primary copies and secondary copies,
      wherein the secondary copies include at least one backup copy, and
      wherein the querying includes accessing a database of metadata to determine which of the multiple data copies contain the requested data without accessing the computer systems where the primary copy is stored; and
   displaying a list of results comprising data copies located by the query that satisfy the request,
      wherein a user can access the one or more data copies by selecting a desired copy from the displayed list,
      wherein querying an index comprises accessing a database of metadata that categorizes data, and
      wherein the database provides a list of data objects organized according to the categories of the data objects.

2. The method of claim 1 wherein the displayed list of results provides a URL for accessing the identified at least one data object through each located data copy.

3. The method of claim 1 wherein the user interface is hosted by a web server with access to multiple data copies at least some of which are located on different physical data storage devices.

4. The method of claim 1 wherein querying an index comprises accessing a metabase that stores metadata describing each copy of the source data.

5. The method of claim 1 wherein the user interface is accessible by more than one type of web browser.

6. The method of claim 1 wherein the identified at least one data object can be accessed through the displayed list irrespective of an operating system on which the at least one data object is stored.

7. The method of claim 1 wherein the identified at least one data object can be accessed through the displayed list irrespective of an operating system being used by a user that submitted the request.

8. The method of claim 1 including for each located data copy containing the identified at least one data object, converting the identified at least one data object to a format accessible by a web browser.

9. The method of claim 1 wherein displaying a list of results comprises displaying a list of results such that a user can view a data object identified by the results without installing additional software.

10. The method of claim 1 wherein displaying a list of results comprises displaying information describing the availability of each data copy relative to other data copies.

11. The method of claim 1 wherein displaying a list of results comprises applying access control to identify results to which a requesting user does not have access.

12. A non-transitory computer-readable medium containing instructions for controlling a computer system to access multiple copies of data through a server, by a method comprising:
   submitting a request identifying at least one data object stored in one or more data copies within a data management system;
   receiving one or more results responsive to the submitted request,
      wherein each result contains a link through which a data object associated with the result can be accessed;
   submitting a request to access a data object associated with one or more of the received results; and
   receiving a version of the data object formatted for display,
      wherein receiving a version of the data object formatted for display comprises converting a data object that is proprietary to one operating system into a format accessible by another operating system.

13. The computer-readable medium of claim 12 wherein receiving a version of the data object formatted for display comprises converting a word processing document in an application-specific format into HTML.

14. The computer-readable medium of claim 12 wherein receiving a version of the data object formatted for display comprises converting an email message into HTML.

15. At least one tangible, non-transitory computer-readable medium storing a display page for identifying and retrieving data objects accessible through multiple copies of similar source data, comprising:
   a criteria entry area configured to receive one or more criteria that identify at least one data object stored within a data management system;
   a search activation indication configured to initiate a search for matching data objects based on the received criteria; and
   a results display area configured to display one or more matching data objects in response to one or more criteria submitted via the criteria entry area and in response to initiation of a search via the search activation indication,
      wherein the results display area provides a link to each data object through which a browser-compatible instance of the data object can be accessed,
      wherein the results display area displays a type associated with each matching data object such that a user can select a matching data object to access based on the type of the data object.

16. The display page of claim 15 wherein the results display area displays the relative availability of each matching data object, such that a user can select a matching data object to access based on the availability of the data object.

17. The display page of claim 15 wherein the criteria entry area contains an area for entering one or more categories associated with the at least one data object stored within the data management system.

18. The display page of claim 15 wherein the results display area displays an indication that a user can not access at least one data object displayable in the results display area because the user is not authorized to access the at least one data object.

* * * * *

UNITED STATES PATENT AND TRADEMARK OFFICE
CERTIFICATE OF CORRECTION

| | | |
|---|---|---|
| PATENT NO. | : 8,229,954 B2 | |
| APPLICATION NO. | : 13/343034 | |
| DATED | : July 24, 2012 | |
| INVENTOR(S) | : Rajiv Kottomtharayil et al. | |

It is certified that error appears in the above-identified patent and that said Letters Patent is hereby corrected as shown below:

On sheet 8 of 8, in Figure 8, Box No. 805, line 1, delete "Confidental" and insert -- Confidential --, therefor.

In column 2, line 6, delete "availably" and insert -- availability --, therefor.

Signed and Sealed this
Thirtieth Day of October, 2012

David J. Kappos
*Director of the United States Patent and Trademark Office*